No. 882,621.
A. G. BROWN.
DUMPING CAR.
APPLICATION FILED NOV. 16, 1907.
PATENTED MAR. 24, 1908.
2 SHEETS—SHEET 1.
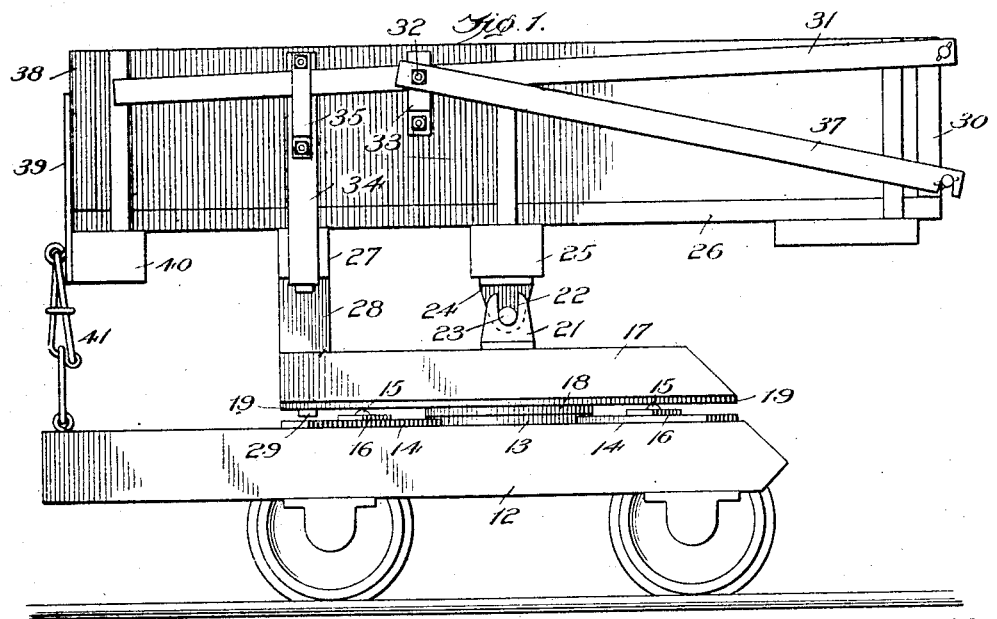
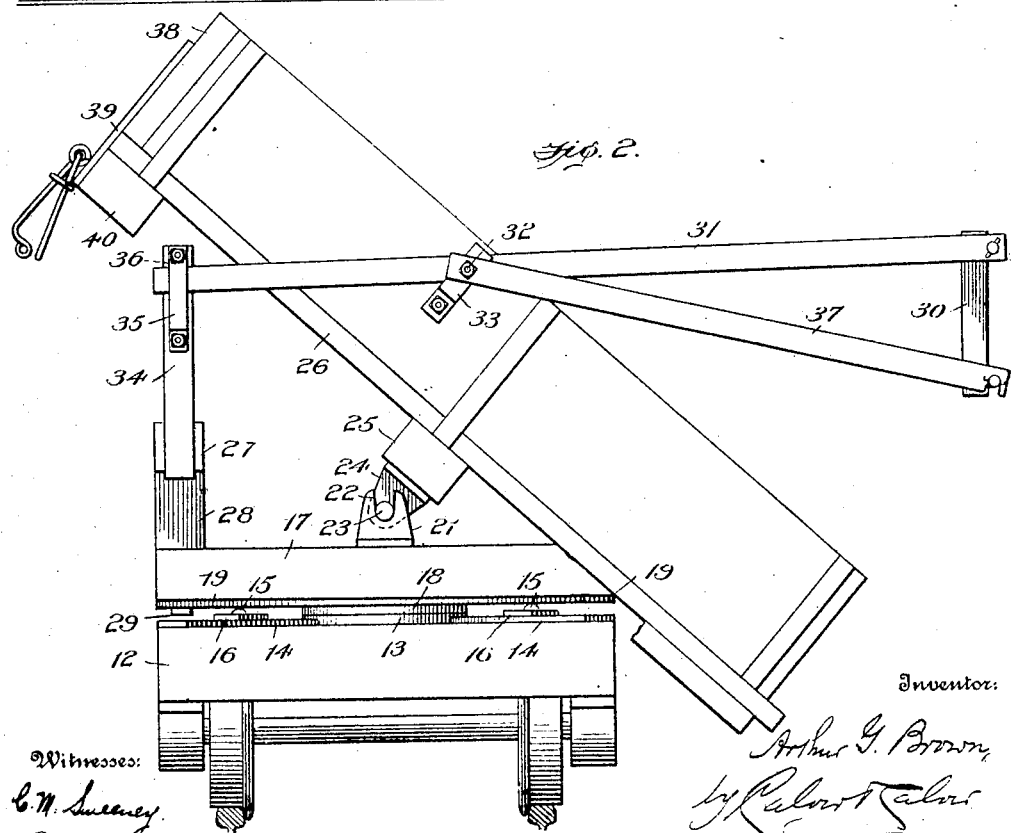

No. 882,621. PATENTED MAR. 24, 1908.
A. G. BROWN.
DUMPING CAR.
APPLICATION FILED NOV. 16, 1907.
2 SHEETS—SHEET 2.
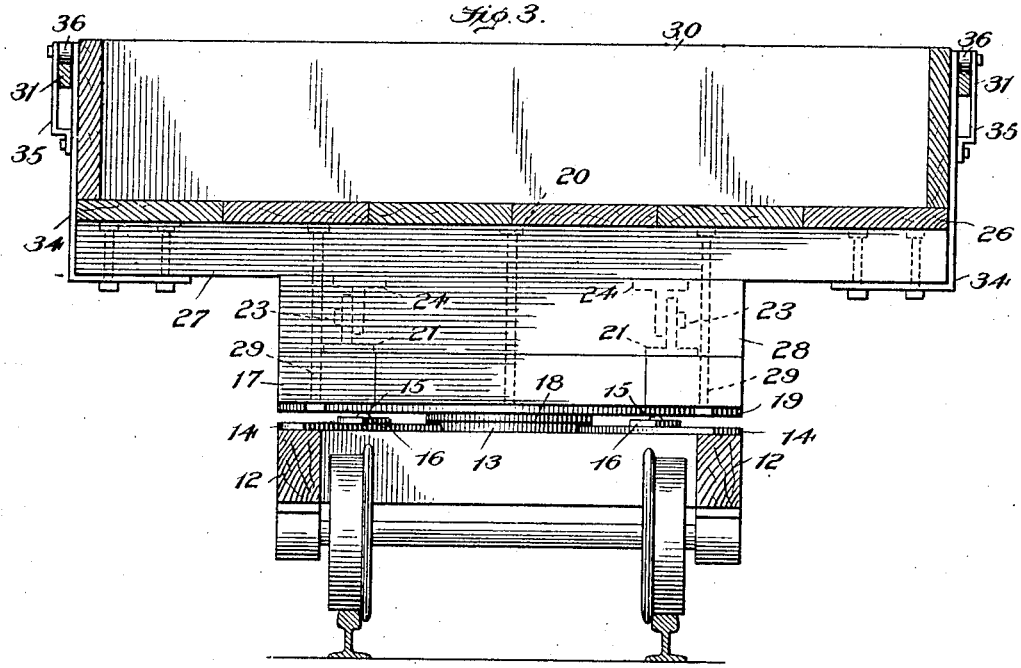
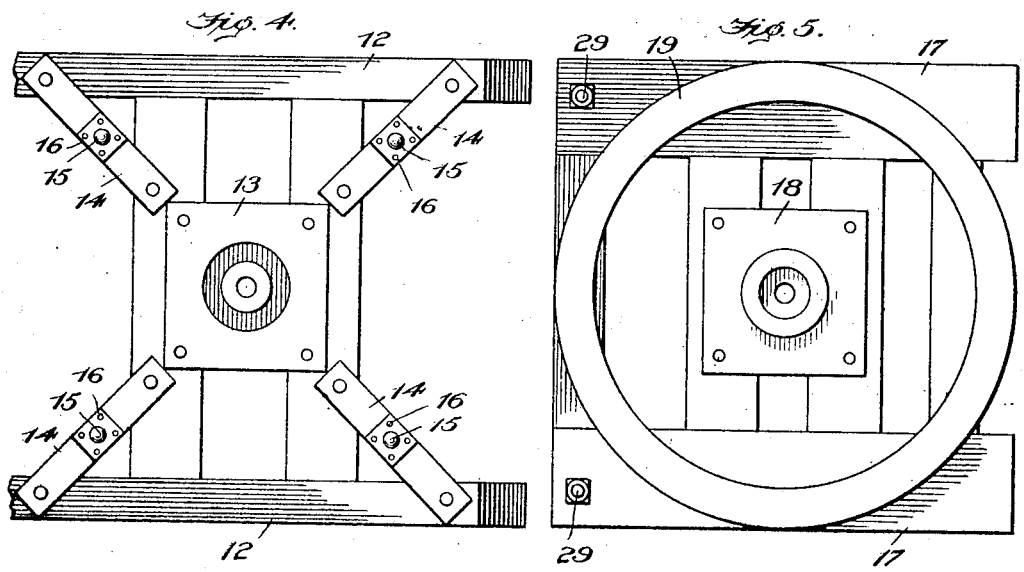
Witnesses:
Edwin L. Bradford
C. M. Sweeney
Inventor:
Arthur G. Brown
By
Attorneys.

UNITED STATES PATENT OFFICE.

ARTHUR G. BROWN, OF SPOKANE, WASHINGTON.

DUMPING-CAR.

No. 882,621.  Specification of Letters Patent.  Patented March 24, 1908.

Application filed November 16, 1907. Serial No. 402,380.

*To all whom it may concern:*

Be it known that I, ARTHUR G. BROWN, a subject of the King of Great Britain, residing at Spokane, in the county of Spokane and State of Washington, have invented or discovered certain new and useful Improvements in Dumping-Cars, of which the following is a specification, reference being had therein to the accompanying drawings.
This invention has for its object to provide an improved turn-table, dumping car, for use in railroad construction or other purposes, and which is of such form that it can be easily turned, and which comprises devices for holding the end gate in a raised position when the car body is tilted in dumping, all as will be hereinafter more fully set forth.

In the accompanying drawings, Figure 1 is a side view of the improved dumping car, and Fig. 2 is a similar view but showing the car-body turned on the truck frame and tilted for dumping. Fig. 3 is a cross-sectional view of the improved car. Fig. 4 is a top view of the truck frame, and Fig. 5 a bottom view of the turn-table.

Referring to the drawings, 12 denotes the truck frame which is mounted on the trucks in any suitable manner. Attached to the truck frame is a lower bolster-plate 13 and radial plates 14, said radial plates being provided with recesses for the reception of anti-friction balls 15 held in place by cap-plates 16. Supported by the truck frame is a turn-table 17 provided beneath with the upper bolster plate 18, and with a ring 19 of iron or other suitable metal serving as a track running over the anti-friction balls 15. The turn-table is pivoted to the truck frame in a well-known manner by a suitable king bolt 20.
Mounted on the turn-table is a bottom casting 21 for the dumping hinge, said casting preferably having open slots 22 receiving the pins or trunnions 23 of the upper dump casting 24 suitably attached to the central cross beam 25 of the car box or body 26, said car body normally resting on a cross-beam 27 which is in turn supported by a second and shorter cross-beam 28, and both of said cross beams are secured to the turn table 17 by suitable bolts 29.

To the front end-gate 30 of the car box or body are attached longitudinal supporting bars 31 pivoted at 32 to brackets or links 33 secured to said car body, the said bars 31 extending through suitable loops on the standards 34 bolted to the cross beam 27, as shown in Fig. 3, strips 35 being secured to said standards to afford the loops through which the said bars 31 pass beneath studs or rollers 36 interposed between said strips and said standards. Said studs or rollers 36 engage the upper sides of the bars 31 and serve as stops to prevent the forward ends of said bars from lifting when the car-body is tilted in dumping. To the lower part of the end gate 30 are detachably attached hooked links 37 the rear ends of which are jointed on the pivots 32 so that the said hooked links can be disengaged from the said end gate, if desired, to permit the latter to swing outward slightly to afford more opening, if required, in dumping.

Owing to the fact that the pivots of the bars 31 are slightly rearward of the pivot or center of motion of the dumping car body it follows that when the front end of said car body is tilted down, in dumping, the front ends of said bars 31 will simultaneously be lifted slightly, thus raising the end gate 30 a little, and as the pivotal points 32 of the said bars will not pass very much forward of the pivotal point of the car body when the latter is lifted, in dumping, the said end-gate 30 will be held in a raised position, as shown in Fig. 2, when the front end of the dumping car box is tilted downward. In this tilting operation the loops of the standards 34, through which the said bars 31 pass, permit suitable endwise movement of said bars relative to said standards, to allow for proper freedom of action of the parts. When the dumping car body is again restored to its normal horizontal position the end gate 30 will close the end of said box by assuming the position shown in Fig. 1.

The car body is preferably provided with a removable rear end gate 38 consisting of a suitable plank held in place by one or more standards 39 attached to a cross-beam 40.
Any suitable detachable connection for retaining the dumping car body in its normal or horizontal position may be employed, said connection, as herein shown, consisting of the link device 41.
From the foregoing it will be apparent that the invention provides a turn-table dumping car of such construction that the car box or body may be easily swung around sidewise for dumping; even when heavily loaded;
while the end gate mechanism is of such construction that the end gate at the front end of the car box will be opened automatically when the car is dumped by the movement of the tilting car body away from the end gate, and the end of the car body will be automatically closed when said car body is restored to its normal horizontal position. Also the open casting, affording the pivot or hinge of the dumping car, is of such construction that should the car be accidentally capsized in dumping the car body will become disengaged from the turn-table, and the latter, being loosely attached to the truck-frame, will become disengaged from the latter, so that the parts can be more easily handled in restoring the car to its proper position if all of these parts were permanently attached together.

Having thus described my invention I claim and desire to secure by Letters Patent:

1. In a dumping car, the combination with a tilting body, of a suitable support on which said body is mounted, standards rigid with said support, an end-gate, longitudinal bars by which said end gate is supported, said bars being pivotally connected with said body and engaging stops on said standards, so that when the said body is tilted the said longitudinal bars may move forward and said end-gate will be held in a raised position, thus permitting the contents of the tilting body to be discharged.

2. In a dumping car, the combination with a tilting body, of a suitable support on which said body is mounted, standards rigid with said support, rollers on said standards an end-gate, longitudinal bars by which said end gate is supported, said bars being pivotally connected with said body and passing beneath said rollers so that when the said body is tilted the said longitudinal bars may move forward and said end-gate will be held in a raised position, thus permitting the contents of the tilting body to be discharged.

3. In a dumping car, the combination with a tilting body, of a suitable turn-table on which said body is mounted, standards rigid with said turn-table, rollers on said standards, an end-gate, longitudinal bars by which said end gate is supported, said bars being pivotally connected with said body and passing beneath and in contact with said rollers which serve as stops for preventing upward movements of the rear ends of said bars, while permitting free longitudinal movements thereof, so that when the said body is tilted said bars may move freely forward and the said end gate will be held in a raised position, thus permitting the contents of the tilting body to be discharged.

4. In a dumping car, the combination with a suitable truck, of a turn-table mounted on said truck and loosely connected therewith, a tilting car body having an open hinged connection with the said turn-table; whereby should the car be accidentally overturned in dumping the car body may become detached from the turn-table, and the turn-table from the truck, to permit these parts to be more easily handled in restoring the car to its proper position.

5. In a dumping car, the combination of a suitable truck provided with anti-friction balls, a turn-table pivotally mounted on said truck and having a circular plate to engage said balls, and a tilting car-body pivotally mounted on said turn-table, said turn-table being provided with standards rearward of the hinge or pivot of said tilting body, said standards having loops, an end-gate, and longitudinal bars supporting said end-gate and passing loosely through said loops and engaging stops on said standards.

6. In a dumping car, the combination of the truck 12 having the recessed radial plates 14, anti-friction balls, cap-plates by which said balls are suitably confined to said radial plates, a turn-table having the bearing ring 19 running over said balls, and the tilting body mounted on said turn-table.

7. In a dumping car, the combination of the truck 12 having the recessed radial plates 14, anti-friction balls, cap-plates by which said balls are suitably confined to said radial plates, a turn-table having the bearing-ring 19 running over said balls, and the tilting body mounted on said turn-table, said tilting body being provided with an end-gate, and means for holding said end-gate in a raised position when said body is tilted.

In testimony whereof I affix my signature, in presence of two witnesses.

ARTHUR G. BROWN.

Witnesses:
A. A. McMILLAN,
C. H. ANDERSON.